March 3, 1964   S. T. COMFORT   3,123,366
LOCKING DEVICE FOR RETAINER OF A HYDRAULIC ACTUATOR
Filed Oct. 27, 1960
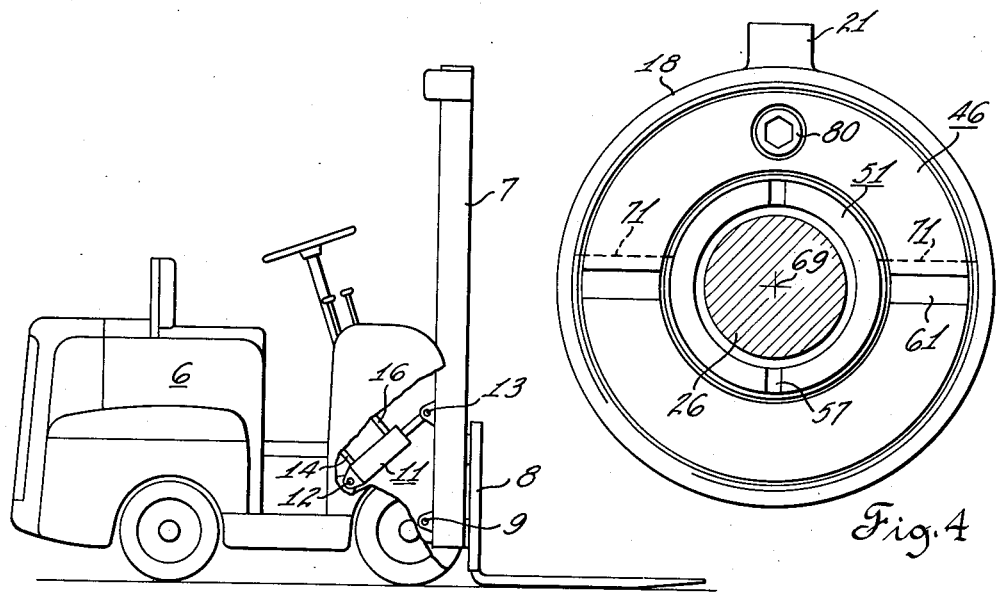
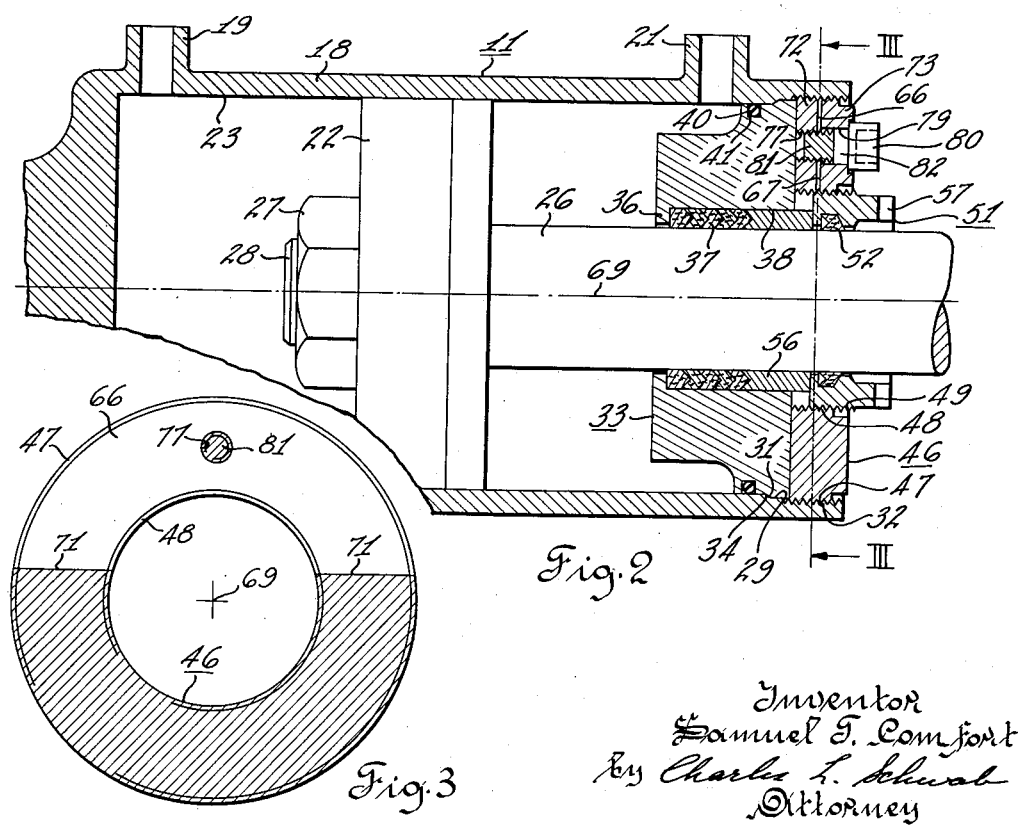
Inventor
Samuel T. Comfort
By Charles L. Schwab
Attorney 3,123,366
LOCKING DEVICE FOR RETAINER OF A HYDRAULIC ACTUATOR
Samuel T. Comfort, Homewood, Ill., assignor to Allis-Chalmers Manufacturing Company, Milwaukee, Wis.
Filed Oct. 27, 1960, Ser. No. 65,377
6 Claims. (Cl. 277—111)

This invention relates to hydraulic actuators and particularly to a double threaded retainer for preventing the packing nut and the retainer from loosening their threaded engagement at the rod end of the actuator.

Heretofore it has been difficult to maintain packing nuts and packing box retainers in their properly installed condition. In the usual hydraulic actuator design, the packing nut is utilized to maintain the packing in the packing box, and the retainer is used to maintain the packing box in one end of the cylinder. The packing box retainer is threaded exteriorly and interiorly, and its exterior threads are complementary to and in threaded engagement with threads on the interior of one end of the cylinder. The packing nut is threaded exteriorly in complementary relation to the interior threads of the retainer. In actual operating conditions the nut and retainer will often become loose, and upon looseness developing the cylinder will leak at the rod end.

In order to meet the requirements of use, the locking arrangement must be quickly disengageable and engageable so as to permit adjustment of the packing nut without disassembly or removal of the actuator from its installed position. Also it should be inexpensive and should not require servicing.

It is an object of this invention to provide a locking device for the retainer and packing nut of a hydraulic actuator to meet the requirements and take care of the problems hereinbefore set out.

It is an object of this invention to provide a locking arrangement for the retainer and packing nut of a hydraulic actuator which will lock both the retainer and packing nut relative to the cylinder.

It is a further object of this invention to provide a double thread locking device for the retainer and packing nut of a hydraulic actuator which is readily releasable to permit adjustment of the packing nut without disassembly or removal of the actuator from its installed position.

These and other objects and advantages of this invention will become apparent to those skilled in the art when the following detailed description is read in conjunction with the accompanying drawings in which:

FIG. 1 is a side view of a fork lift truck showing a hydraulic actuator for tilting the mast which incorporates this invention;

FIG. 2 is a section of the hydraulic actuator shown in FIG. 1;

FIG. 3 is a section of the retainer taken on line III—III of FIG. 2; and

FIG. 4 is a right hand end view of the actuator shown in FIG. 2.

Referring to FIG. 1, a lift truck 6 is provided with a tiltable mast 7 carrying a vertically movable carriage 8. The mast 7 is pivotally connected to the lift truck 6 by a pair of pivot pins 9, only one of which is shown. Pivoting of the mast 7 about pivot pins 9 is controlled by a hydraulic actuator 11 pivotally connected at its opposite ends, by pivot pins 12 and 13, to the frame of the truck and mast, respectively. The hydraulic actuator is double acting and is supplied with pressure fluid through its conduits 14 and 16 by a hydraulic system, not shown, carried on the truck.

Referring to FIG. 2, the hydraulic supply lines 14 and 16 are connected to the cylinder 18 of the hydraulic actuator 11 at threaded nipples 19 and 21, respectively. A piston 22 is installed within the cylinder 18 to reciprocally move in sealing relation to the cylinder internal surface 23. The piston 22 is connected to a piston rod 26 by a nut 27 which is threaded onto a threaded end portion 28 of the rod 26.

A stepped bore 29 is formed in the rod end of the cylinder 18 and a frusto-conical surface 31 is machined between the stepped bore 29 and the inner cylindrical surface 23. Internal threads 32 are formed on the rod end of the cylinder in axially external relation to the frusto-conical abutment surface 31.

A packing box 33 is formed with a frusto-conical surface 34 in complementary relation to the frusto-conical surface 31 formed on the cylinder. The axially inward portion of the packing box 33 carries a radially inwardly extending flange 36 for limiting axial movement of packing 37 carried within the inner bore 38 of the packing box. An O-ring 40 is installed in an annular groove 41 in the packing box to insure a fluid sealing relationship between the packing box and the cylinder.

A retainer 46 is provided to maintain the frusto-conical surfaces 31, 34 in engagement. The retainer has external threads 47 complementary to and engaging the internal threads 32 formed on the cylinder. Also the retainer 46 has internal threads 48 for complementary threaded engagement with threads 49 formed on a packing nut 51. The packing nut 51 carries a packing gland 52 which serves as a wiper for the rod 26. Intermediate the packing nut 51 and the packing 37 is a packing adapter 56. This packing adapter serves to transmit thrust from the packing nut 51 to the packing 37 to maintain axial thrust on the packing for proper sealing.

Referring to FIGS. 2, 3 and 4, the retainer 46 is slotted to provide an axial space between side walls 66 and wrench used to screw the packing nut 51 into the retainer 46. Similarly the retainer 46 has a pair of slots 61 for receiving a spanner wrench to screw the retainer into the rod end of the cylinder.

Referring to FIGS. 2, 3 and 4, the retainer 46 is slotted to provide an axial space between side walls 66 and 67. This radial slot defined by walls 66, 67 and bottom wall 71, intersects threads 47 and 48 and extends toward the axis 69 of the retainer to a depth short of radially splitting the retainer to its axis. The axis 69 is also the axis of the actuator, cylinder rod, piston, packing box, packing nut, packing and packing adapter as well as the wiper 52. Also axis 69 is the axis of threads 32, 47, 48, 49. The retainer has a threaded hole 77 formed in the axially inner segment of the split portion 72 of the retainer and has a bore 79 formed in the split portion 73 of retainer 46. A releasable locking means in the form of a cap screw 80 has a threaded part 81 in engagement with the threads 77 and a shank part 82 fitting loosely in the bore 797. When the cap screw is tightened the underside of the cap part of the screw presents an abutment surface in thrust transmitting engagement with portion 73 and the retainer is deformed, that is, the split portions 72, 73 of the retainer are drawn toward one another. This action will jam the threads of the cylinder and retainer together to resist relative movement. Likewise, since the slot extends radially inwardly to intersect the internal threads 48 of the retainer, the internal thread 48 and threads 49 of the packing nut will be jammed together thereby releasably locking the packing nut and the retainer together.

When the packing nut and retainer have been installed, the cap screw is then tightened to lock the retainer relative to the cylinder and the packing nut. This locking operation is performed by merely screwing the cap screw 80 to draw the two split segments of the retainer toward one another. If it is desired to adjust the packing nut 51, due to wear of the packing 37, for intsance, one merely needs to loosen the cap screw 80 and then screw the packing nut 51 with a spanner wrench to the position desired; then the cap screw 80 is again tightened to lock the retainer to the cylinder and the packing nut to the retainer. Thus, it is seen that a simple and extremely convenient double thread jam means is provided to lock two sets of threads together to prevent two threaded members from rotation relative to a third member in the form of a cylinder. This locking arrangement has particular utility in an actuator of the expansible and contractible type having a pair of relatively telescoping thrust transmitting members in the form of cylinder 18 and the illustrated piston and rod assembly.

It is to be understood that although only one embodiment of the invention has been shown and described in detail, it is not intended to limit the patent granted hereon otherwise than is necessitated by the scope of the appended claims.

What is claimed is:

1. A sealing arrangement for radially inner and outer members which are relatively movable on an axis, said sealing arrangement comprising: a packing, means for maintaining said packing in radial sealing relation with said inner member including a retainer having internal and external threads coaxial with said axis, a packing nut having external threads complementary to and in threaded engagement with the internal threads of the retainer, internal threads in said outer member complementary to and in threaded engagement with said external threads of said retainer, axially spaced portions on said retainer separated by a radial slot intersecting said interial and external threads of said retainer, releasable locking means coacting with said portions to axially move one of said portions relative to the other of said portions to jam the internal and external threads of said retainer on said threads of said packing nut and said outer member, respectively, thereby selectively preventing loosening of said packing nut and retainer.

2. The structure set forth in claim 1 wherein said releasable locking means includes a screw in threaded engagement with one of said portions and in thrust transmitting engagement with the other of said portions.

3. A sealing arrangement for radially inner and outer members which are relatively movable on an axis, said sealing arrangement comprising: a packing, means for holding said packing in radially sealing contact with one of said members including a retainer having external and internal threads coaxial with said axis and portions separated by a radial slot intersecting said threads, a packing nut in axial thrust transmitting relation to said packing and having threads complementary to and in threaded engagement with one of said external and internal threads of said retainer, threads formed in the other of said members complementary to and in threaded engagement with the other of said external and internal threads of said retainer, and releasable locking means coacting with said portions to selectively change the spacing between said portions thereby jamming the internal and external threads of said retainer against said threads on said nut and said other member.

4. The structure set forth in claim 3 wherein said threads on said packing nut are external threads and said threads on said other member are internal threads, and said packing nut may be screwed on said retainer after release of said locking means to apply proper thrust to said packing without disassembly of said members.

5. The structure set forth in claim 4 wherein said locking means comprises an axially extending threaded opening in one of said portions and a screw having a threaded part in threaded engagement with said threaded opening and an abutment surface in thrust transmitting engagement with the other portion whereby turning of said screw deflects one of said portions relative to the other.

6. A sealing arrangement for radially inner and outer members which are relatively movable on an axis, said sealing arrangement comprising: a packing box, packing in said packing box in radially sealing contact with one of said members, a packing box retainer axially abutting said packing box and having external and internal threads coaxial with said axis, axially spaced walls in said retainer defining a radial slot intersecting said external and internal threads and separating axially spaced portions of said retainer, a packing nut in axial thrust transmitting relation to said packing and having threads complementary to and in threaded engagement with one of said external and internal threads of said retainer, threads formed in the other of said members complementary to and in threaded engagement with the other of said external and internal threads of said retainer, and releasable locking means coacting with said portions to selectively change the spacing between said portions thereby jamming the internal and external threads of said retainer against said threads on said nut and said other member.

References Cited in the file of this patent

UNITED STATES PATENTS

| | | |
|---|---|---|
| 1,065,392 | Power | June 24, 1913 |
| 2,002,713 | Penick et al. | May 28, 1935 |
| 2,037,293 | Weinman | Apr. 14, 1936 |
| 2,422,248 | Lord | June 17, 1947 |
| 2,605,748 | Rasoletti | Aug. 15, 1952 |
| 2,783,744 | Tennis | Mar. 5, 1957 |
| 2,891,513 | Fagge | June 3, 1959 |